United States Patent [19]

Hartman et al.

[11] 4,024,773
[45] May 24, 1977

[54] ENDLESS POWER TRANSMISSION BELT STRUCTURE

[75] Inventors: Russell E. Hartman; Dewey D. Henderson, both of Springfield, Mo.

[73] Assignee: Dayco Corporation, Dayton, Ohio

[22] Filed: June 1, 1976

[21] Appl. No.: 691,958

[52] U.S. Cl. .................................. 74/233
[51] Int. Cl.² ............................. F16G 5/16
[58] Field of Search ......... 74/233 C, 234, 231 P; 156/139, 140

[56] References Cited

UNITED STATES PATENTS

| | | | |
|---|---|---|---|
| 3,987,684 | 10/1976 | Fisher et al. | 74/233 |
| 3,995,507 | 12/1976 | White et al. | 74/233 |

*Primary Examiner*—Leonard H. Gerin
*Attorney, Agent, or Firm*—Reuben Wolk

[57] ABSTRACT

A substantially trapezoidal endless belt structure is provided which has reduced coefficient of friction raw-edged non-parallel sides, a plurality of layers of frictioned fabric of different thicknesses, and a load-carrying cord which may be made of a thermally stable material.

26 Claims, 5 Drawing Figures

ENDLESS POWER TRANSMISSION BELT STRUCTURE

BACKGROUND OF THE INVENTION

Endless raw-edged trapezoidal power transmission belts in present use are what is referred to in the art as "too aggresive" for clutching applications where each belt is brought into and out of clutching engagement with associated sheaves due to the comparatively high coefficient of friction of the sides of the belt. Further such presently used belts have poor reverse bending properties, have unsatisfactory load-carrying capacities, and tend to delaminate.

SUMMARY

It is a feature of this invention to provide a simple and economical substantially trapezoidal endless power transmission belt structure which is particularly adapted for use in clutching applications.

Another feature of this invention is to provide an endless belt structure of the character mentioned having a thermally stable load-carrying cord.

Another feature of this invention is to provide an endless belt structure of the character mentioned having raw-edged sides provided with a reduced coefficient of friction which enables smooth clutching engagement with associated sheaves in a nonaggressive manner.

Another feature of this invention is to provide a belt of the character mentioned having a plurality of frictioned fabric layers which retard crack propagation and fabric delamination of the belt.

Another feature of this invention is to provide a belt of the character mentioned which may be used satisfactorily in reverse bending applications.

Another feature of this invention is to provide an endless power transmission belt which employs comparatively thick fabric layers for better belt support and which uses comparatively thinner fabric layers with the thick layers to minimize any tendency for belt delamination.

Accordingly, it is an object of this invention to provide an endless power transmission belt having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
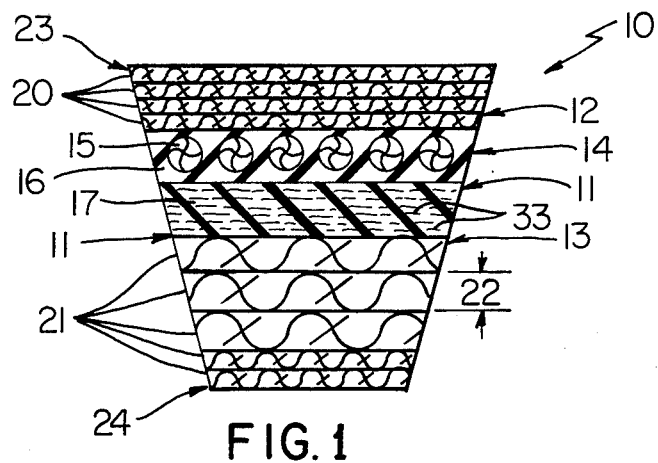
FIG. 1 is a cross-sectional view illustrating one exemplary embodiment of an endless power transmission belt of this invention.

Reference is now made to FIG. 1 of the drawing which illustrates one exemplary embodiment of an endless power transmission belt structure or belt of this invention which is designated generally by the reference numeral 10. The belt 10 is made primarily of elastomeric material and fabric layers as will be described in detail subsequently, and is in the form of a substantially trapezoidal structure having raw-edged non-parallel sides each designated generally by the same reference numeral 11 and the sides 11 have a reduced coefficient of friction and for a purpose to be described in more detail subsequently.

The belt 10 has a tension section 12, a compression section 13, and a load-carrying section 14 comprised of a continuous thermally stable longitudinally extending load-carrying cord 15 disposed between the tension section 12 and compression section 13 and defined by a plurality of helically wound turns; and, the cord 15 is embedded in an elastomeric matrix 16 made of a suitable matrix-like material such as neoprene gum, or the like. The belt 10 has at least one platform layer or platform adjoining the load-carrying cord and such platform is designated generally by the reference numeral 17 and is provided in and comprises an inner portion of the compression section 13 of such belt. The platform 17 of belt 10 has an anti-friction material dispersed therethrough in a homogeneous manner and in this example of the invention such an anti-friction material is in the form of graphite compounded in an elastomeric matrix in the form of rubber.

The exemplary belt 10 has a plurality of four fabric layers 20 defining its tension section 12 and a plurality of five fabric layers 21 defining its compression section 13. In this exemplary embodiment of the invention three of the innermost fabric layers comprising the compression section have an equal thickness 22 which is substantial as indicated typically for the central one of the innermost layers 21 of the compression section. The two outermost layers of the compression section 13 have a thickness which is roughly ½ the thickness of the three innermost layers. As will be readily apparent from FIG. 1 of the drawing, the outermost layer 20 of the tension section defines the outside surface of the belt 10 as indicated at 23 and the outermost layer 21 of the compression section defines the inside surface of such belt as indicated at 24.

Figure 2:
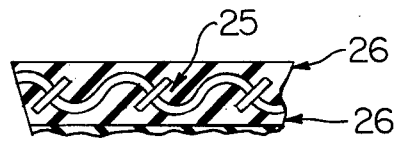
FIG. 2 is a fragmentary cross-sectional view illustrating a typical woven fabric layer of the belt of this invention which has been frictioned.

Each of the fabric layers 20 and 21 regardless of its thickness or weight is a frictioned layer and as is known in the art is made by any suitable process such as a calendering process wherein a rubber compound is forced between the spaces of the constituent threads, such as the warps and wefts in the case of woven fabric, as indicated at 25 in FIG. 2, while providing a substantial thickness, indicated at 26, on each side of each layer whether it be layer 20 or 21. With such a structure there is a more tenacious bond between layers of an associated belt whereby such belt, even though it has a comparatively large number of fabric layers, provides a unitary structure which retards any tendency for crack propagation in the event cracks are defined at any location in the belt 10. With frictioned layers there is also less tendency for delamination of the fabric layers 20–21, even the compression section layers 21 which in previous belts ordinarily have greater tendency to delaminate. The layers 20 and 21 are preferably woven layers and the substantial thickness 22 of the woven compression section layers has the added advantage of allowing such layers to yield in a resilient manner during compression thereof which further serves to reduce any tendency for layer delamination.

Figure 3:
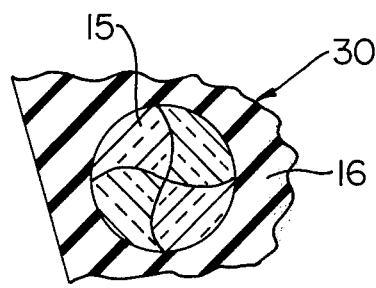
FIG. 3 is an enlarged fragmentary cross-sectional view particularly illustrating an exemplary load-carrying cord which may comprise the belt of this invention.

As previously mentioned the belt 10 has a continuous thermally stable load-carrying cord 15 which is of high strength when compared with similar cords of the more commonly sold belts. The high strength thermally stable cord may be made of fiberglass yarn embedded in its matrix 16 as indicated at 30 in FIG. 3 of the drawing which illustrates an enlarged cross-section of a single turn of the cord.

Figure 4:
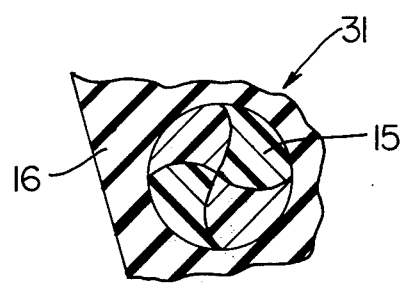
FIG. 4 is an enlarged fragmentary cross-sectional view similar to FIG. 3 illustrating another exemplary embodiment of a load-carrying cord which may comprise the belt of this invention.

The high strength thermally stable cord 15 is preferably made of aramid yarn embedded in its matrix 16 as indicated at 31 in FIG. 4. Aramid is a generic fiber classification authorized by the United States Federal Trade Commission. An example of aramid yarn is one made and sold under the registered trademark "KEVLAR" by the E. I. DuPont de Nemours & Company of Wilmington, Del. Another aramid yarn which may be used to make cord 15 is made and sold under the registered trademark of "NOMEX" also by the above-mentioned DuPont Company. Basically aramid fiber comprising aramid yarn is an organic man-made fiber within the family of aramatic polyamides.

The platform layer 17 of the belt 10 is provided in the compression section 13 and in additon to having graphite dispersed therethrough in a homogeneous manner to reduce the coefficient of friction at the sides 11 of belt 10 such layer 17 has a plurality of elongated discrete fibers 33 embedded in the elastomeric matrix defining such layer. The fibers 33 are disposed in substantially parallel relation transverse, preferably perpendicular to, the endless path of the belt 10 and thus transverse the longitudinally extending load-carrying cord 15 and in parallel relation between the parallel sides of the trapezoidal belt. The fibers 33 may be made of any suitable material and are preferably in the form of non-metallic organic fibers each having a diameter ranging between 0.001 inch and 0.005 inch and a length ranging between 0.001 inch and several inches. The fibers 33 may also be made of blends or mixtures of several materials.

Figure 5:
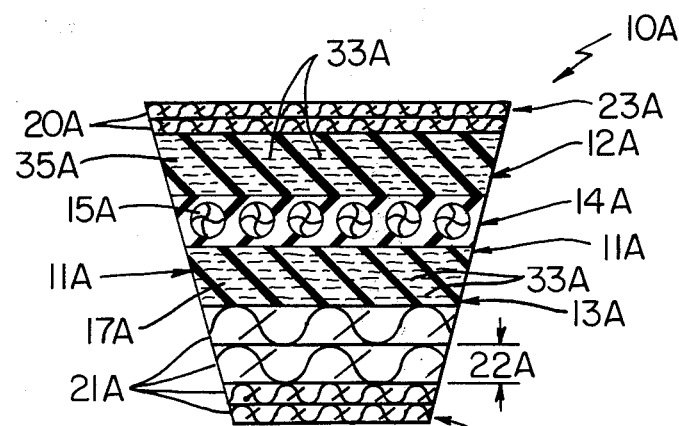
FIG. 5 is a cross-sectional view similar to FIG. 1 illustrating another embodiment of the belt of this invention.

Another exemplary embodiment of the belt structure or the belt of this invention is illstrated in FIG. 5 of the drawing. The belt illustrated in FIG. 5 is similar to the belt 10; therefore, such belt will be designated by the reference numeral 10A and representative parts of such belt which are similar to corresponding parts of the belt 10 will be designated in the drawing by the same reference numerals as the belt 10 (whether or not such representative parts are mentioned in the specification) followed by the letter designation A and not described again in detail. Only those component parts of the belt 10A which are different than corresponding parts of the belt 10 will be designated by a new reference numeral also followed by the letter designation A and described in detail.

The trapezoidal belt 10A has opposed symmetrically arranged raw-edged non-parallel sides 11A, a tension section 12A, a compression section 13A, and a load-carrying section 14A. The belt 10A has two layers of frictioned fabric 20A defining the outer portion of the tension section 12A. The belt 10A also has four layers of frictioned fabric 21A defining the outer portion of the compression section with two of the innermost layers 21A having increased thickness 22A. The belt 10A also has a platform 17A provided with fibers 33A.

The main difference between the belt 10 and the belt 10A is that the belt 10A has a second platform layer designated by the reference numeral 35A and provided in the tension section 12A adjoining the load-carrying section 14A and in particular adjoining the top surface of the matrix material 16A which has the thermally stable helically wound load-carrying cord 15A embedded therein. The platform layer 35A also has graphite dispersed therethrough in a homogeneous manner and such graphite is provided for the purpose of reducing the coefficient of friction at the sides of 11A of the belt 10A. The belt 10A also has frictioned layers 20A and 21A defining its outside and inside surfaces respectively as shown at 23A and 24A.

In the belts 10 and 10A the thickness of each platform layer, whether it be the single platform in the compression section of the belt 10 or each of the pair of platforms on opposite sides of the load-carrying section 14A in the belt 10A, is based on the desired anti-friction characteristics of the non-parallel sides of the trapezoidal belt. Further, the amount of graphite may be precisely controlled within desired limits to achieve such desired anti-friction characteristics.

The belt of this invention has a comparatively large number of fabric layers in its tension and compression sections and although such layers are frictioned layers they have a considerable number of fabric threads or portions exposed at the non-parallel sides of their belt. These threads cooperate with the anti-friction material of the platform layer or layers to control the coeffcient of friction at the sides of the trapedoizal belt.

The belt of this invention whether comprised of one platform layer as shown in FIG. 1 or two platform layers as shown in FIG. 5 has its fabric layer defined as frictioned layers as previously mentioned and such frictioned fabric layers cooperate to provide a more tenacious bond with each other and with other adjoining belt components to thereby retard crack propagation and delamination of the various layers.

The thermally stable substantially inextensible load-carrying cord of the belt of this invention also assures satisfactory belt operation under extremes in temperature with the entire belt remaining substantially extensible whereby this feature of the belt also assures that there is minimum tendency for delamination of the belt. Further, by providing platform layers comprised of fibers which inherently are not disposed in sharply defined planes there is less tendency for the platforms themselves to delaminate.

Each of the fabric layers comprising the tension section of the belt of this invention may be in the form of frictioned fabric layers often classified by weight per standard unit area and four ounce through eight ounce frictioned fabric may be used for these layers. Similarly, the outermost layers in the compression section of each belt of this invention may also be frictioned fabric ranging in weight from four through eight ounces. The intermediate layers in the compression section of each belt, shown as having a substantial thickness, are in excess of 10 ounce and preferably 14 ounce frictioned fabric.

The layers 20, 21, 20A, and 21A may be made of any suitable fabric material including non-woven, square woven, bias, stress-relieved, knitted, or the like.

In this disclosure of the invention reference has been made to the fact that graphite is used to promote antifriction properties at the sides of each belt. However, it is to be understood that any suitable antifriction material may be used for this purpose. Further, in such instances where graphite is utilized in a rubber compound comprising each platform the weight of graphite in each platform layer is roughly within the range of 10 to 30 percent of the weight of the rubber compound.

While present exemplary embodiments of this invention, and methods of practicing the same, have been illustrated and described, it will be recognized that this invention may be otherwise variously embodied and practiced within the scope of the following claims.

What is claimed is:

1. An endless substantially trapezoidal power transmission belt structure having reduced coefficient of friction raw-edged non-parallel sides and comprising, a tension section, a compression section, a continuous thermally stable longitudinally extending load-carrying cord disposed between said sections and defined by a plurality of helically wound turns, at least one platform adjoining said load-carrying cord, said platform comprising an elastomeric matrix having an anti-friction material dispersed therethrough in a homogeneous manner to reduce the coefficient of friction of said sides, a fabric layer defining the inside surface of said belt, and a fabric layer defining the outside surface of said belt.

2. A belt structure as set forth in claim 1 in which each of said fabric layers is a frictioned layer which is tenaciously bonded to its associated section and serves to retard crack propagation and fabric delamination.

3. A belt structure as set forth in claim 2 in which each of said fabric layers is a layer of woven fabric.

4. A belt structure as set forth in claim 1 in which said one platform has a plurality of elongated discrete fibers embedded in said matrix, said fibers being disposed transverse said longitudinally extending cord.

5. A belt structure as set forth in claim 1 in which said load-carrying cord is made of fiberglass yarn.

6. A belt structure as set forth in claim 1 in which said load-carrying cord is made of aramid yarn.

7. A belt structure as set forth in claim 1 in which said anti-friction material is in the form of graphite.

8. A belt structure as set forth in claim 1 and further comprising at least one more fabric layer disposed inwardly of each of said fabric layers.

9. A belt structure as set forth in claim 8 in which each of said fabric layers is a frictioned layer of woven fabric.

10. A belt structure as set forth in claim 1 made primarily of rubber and layers of woven fabric.

11. An endless substantially trapezoidal power transmission belt structure for clutching and reverse bending applications having reduced coefficient of friction raw-edged non-parallel sides and comprising, a tension section having a plurality of fabric layers defining its outer portion, a compression section having a plurality of fabric layers defining its outer portion, a continuous thermally stable longitudinally extending load-carrying cord disposed between said sections and defined by a plurality of helically wound turns, and at least one platform adjoining said load-carrying cord, said platform comprising an elastomeric matrix having an anti-friction material dispersed therethrough in a homogeneous manner to reduce the coefficient of friction of its opposed sides, said platform cooperating with said fabric layers to reduce the coefficient of friction of said non-parallel sides.

12. A belt structure as set forth in claim 11 in which each of said fabric layers is a frictioned layer which is tenaciously bonded in its associated section and serves to retard crack propagation and fabric delamination even during reverse bending applications.

13. A belt structure as set forth in claim 12 in which said platform comprises said compression section and further comprising another platform in said belt adjoining said load-carrying cord and comprising said tension section, said other platform also comprising an elastomeric matrix having an anti-friction material dispersed therethrough in a homogeneous manner to reduce the coefficient of friction of its opposed sides, said other platform cooperating with said one platform and said fabric layers to reduce the coefficient of friction of said non-parallel sides.

14. A belt structure as set forth in claim 13 in which said load-carrying cord is made of fiberglass yarn.

15. A belt structure as set forth in claim 13 in which said load-carrying cord is made of aramid yarn.

16. A belt structure as set forth in claim 13 in which said anti-friction material is in the form of graphite.

17. A belt structure as set forth in claim 13 in which each of said fabric layers of said tension section is of the same weight per unit area.

18. A belt structure as set forth in claim 17 in which the fabric layers of said compression section are of a plurality of different weights per unit area.

19. A belt structure as set forth in claim 13 in which each of said platforms has a plurality of elongated discrete reinforcing fibers embedded therein.

20. A belt structure as set forth in claim 19 in which said fibers of each platform are randomly dispersed therethrough with their elongated dimensions disposed in parallel relation substantially parallel to the parallel sides of said belt structure and substantially perpendicular to a longitudinal axis of said belt structure.

21. An endless substantially trapezoidal power transmission belt structure for clutching and reverse bending applications having reduced coefficient of friction raw-edged non-parallel sides and comprising, a tension section having a plurality of fabric layers defining its outer portion, a compression section having a plurality of fabric layers defining its outer portion, load-carrying means disposed between said sections, and at least one platform adjoining said load-carrying cord, said platform comprising an elastomeric matrix having an anti-friction material dispersed therethrough in a homogeneous manner to reduce the coefficient of friction of its opposed sides, said platform cooperating with said fabric layers to reduce the coefficient of friction of said non-parallel sides.

22. A belt structure as set forth in claim 21 in which said plurality of fabric layers of at least one of said sections comprises at least one fabric layer of substantial thickness for improved support for said belt structure and at least one fabric layer having a thickness less than said substantial thickness.

23. A belt structure as set forth in claim 21 in which said plurality of fabric layers of at least one of said sections comprises a plurality of fabric layers each having a substantial thickness for improved support for said belt structure and a plurality of fabric layers each having a thickness less than said substantial thickness for improving the resistance of said belt structure to delamination between fabric layers.

24. A belt structure as set forth in claim 23 in which each of said fabric layers having a thickness less than said substantial thickness has a thickness roughly one half of said substantial thickness.

25. A belt structure as set forth in claim 24 in which each of fabric layers is a woven fabric layer.

26. A belt structure as set forth in claim 21 in which said plurality of fabric layers of said compression section comprises a plurality of fabric layers each having a substantial thickness for improved support of said belt structure, said plurality of fabric layers of substantial thickness being yieldable in a resilient manner during compression thereof which serves to reduce any tendency for layer delamination.

* * * * *